United States Patent [19]

Chen

[11] Patent Number: 5,647,684
[45] Date of Patent: Jul. 15, 1997

[54] TWO-STEP AND TOOTHLESS BICYCLE HEAD SHAFT BOWL SET

[76] Inventor: Chia-Ching Chen, 307, Chieh-Shou Villiage, Changhua City, Taiwan

[21] Appl. No.: 441,748

[22] Filed: May 16, 1995

[51] Int. Cl.$^6$ .................................................. F16B 2/14
[52] U.S. Cl. .................... 403/370; 403/374; 403/24; 74/551.1; 280/279
[58] Field of Search .................... 403/364, 365, 403/367, 368, 370, 371, 373, 374, 24, 26, 133, 135; 74/551.1, 551.3; 280/279; 384/548, 537, 538

[56] References Cited

U.S. PATENT DOCUMENTS

| | | | |
|---|---|---|---|
| 4,068,858 | 1/1978 | Harrison et al. | 403/370 X |
| 4,167,352 | 9/1979 | Pletscher | 403/374 X |
| 4,318,627 | 3/1982 | Morin | 403/133 |
| 4,511,277 | 4/1985 | McCabe | 403/140 |
| 5,085,063 | 2/1992 | Van Dyke et al. | 403/374 X |
| 5,095,770 | 3/1992 | Rader, III | 74/551.1 |
| 5,197,349 | 3/1993 | Herman | 74/551.1 |
| 5,201,242 | 4/1993 | Chi | 74/551.1 |
| 5,213,006 | 5/1993 | Liao | 74/551.1 |
| 5,332,245 | 7/1994 | King | 74/551.1 X |
| 5,387,255 | 2/1995 | Chiang | 74/551.1 |
| 5,400,676 | 3/1995 | Kao | 74/551.1 |
| 5,496,126 | 3/1996 | Lin | 74/551.1 X |
| 5,536,104 | 7/1996 | Chen | 403/370 |

*Primary Examiner*—Harry C. Kim
*Attorney, Agent, or Firm*—Larson and Taylor

[57] ABSTRACT

A fastening device is capable of holding securely the head tube and the handlebar sleeve in the front fork of a bicycle. The front fork is provided respectively at both upper end thereof and lower end thereof with a restraining ring which is of an arcuate construction and is capable of bringing about an automatic calibration so as to ensure that the bearing sets of the front fork cooperate properly and rotate smoothly.

5 Claims, 6 Drawing Sheets

TWO-STEP AND TOOTHLESS BICYCLE HEAD SHAFT BOWL SET

FIELD OF THE INVENTION

The present invention relates generally to a bicycle, and more particularly to a head shaft bowl set of the bicycle.

BACKGROUND OF THE INVENTION

It is generally known among the bicyclists that the head tube, the handlebar sleeve and the front fork of a bicycle are vulnerable to becoming loose, and that they are susceptible to making an aggravating noise when the bicycle is in operation. A remedial measure of the prior art is illustrated in FIG. 1, in which a front fork 71A is shown to be provided on the inner wall of the upper end thereof with a threaded portion 72A to which a rod 40A and a front tube 60A are fastened by means of an adjustment nut 21A, a compression ring 50A, and a seat ring 61A. Such a prior art fastening method as described above is defective in design in that the front fork 71A must be provided with the threaded portion 72A which cannot be machined easily and economically.

Another prior art remedial measure is shown in FIG. 2 and is provided with two spring leaves 1B, which are located in the front fork 71B by means of a fastening bolt 11B such that the two spring leaves 1B are retained securely in the front fork 71B when the two spring leaves 1B are pulled upwards. In addition, the remedial measure is provided with a restraining ring 50B, which can be so pressed as to cause the handlebar sleeve 40B to be fastened securely with the front fork 71B. The fastening effect of the two spring leaves 1B is undermined by the fact that the front fork 71B is made of a steel material and is therefore incompatible with the two spring leaves 1B which work effectively with a tube wall of a soft and nonmetallic material. In addition, such a prior art remedial measure is unsafe in view of the fact that the handlebar sleeve 40B and the front fork 71B are rather vulnerable to becoming disengaged when two screws 41B become unfastened accidentally. Moreover, the front fork 71B is provided with a bearing seat which is fastened with the bottom of the front fork 71B by an external force and is therefore not cost-effective.

SUMMARY OF THE INVENTION

It is therefore the primary objective of the present invention to provide a fastening means capable of holding the head tube and the handlebar sleeve securely in the front fork of a bicycle. The front fork is provided respectively at both upper end thereof and lower end thereof with a restraining ring which is of an arcuate construction and is capable of bringing about an automatic calibration so as to ensure that the bearing sets of the front fork cooperate properly and that the bearing sets of the front fork can rotate smoothly.

The foregoing objective, features and advantages of the present invention will be more readily understood upon a thoughtful deliberation of the following detailed description of the present invention in conjunction with the accompanying drawings.

DETAILED DESCRIPTION OF THE INVENTION

Figure 1:
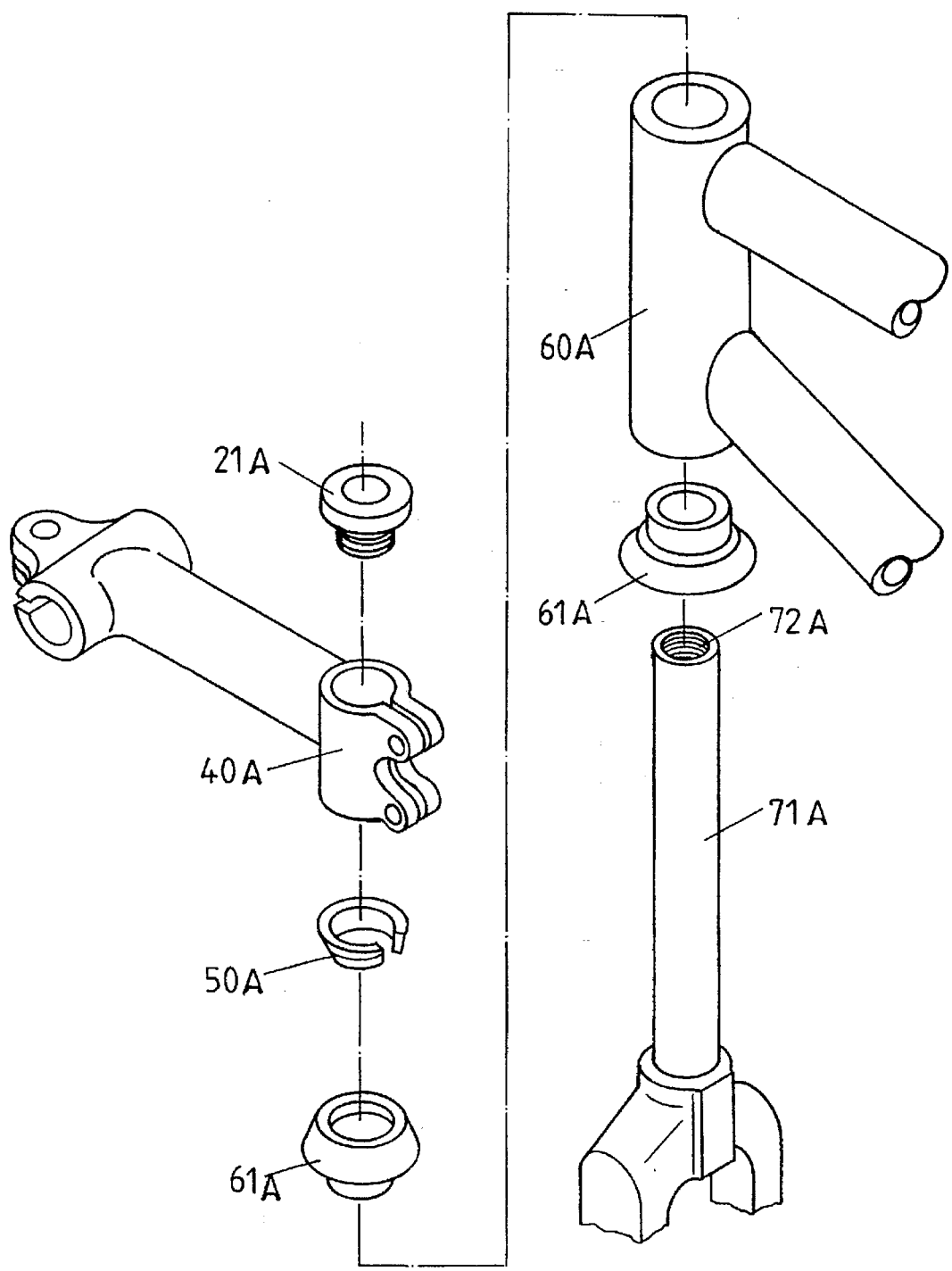
FIG. 1 shows an exploded view of a prior art fastening device.
Figure 2:
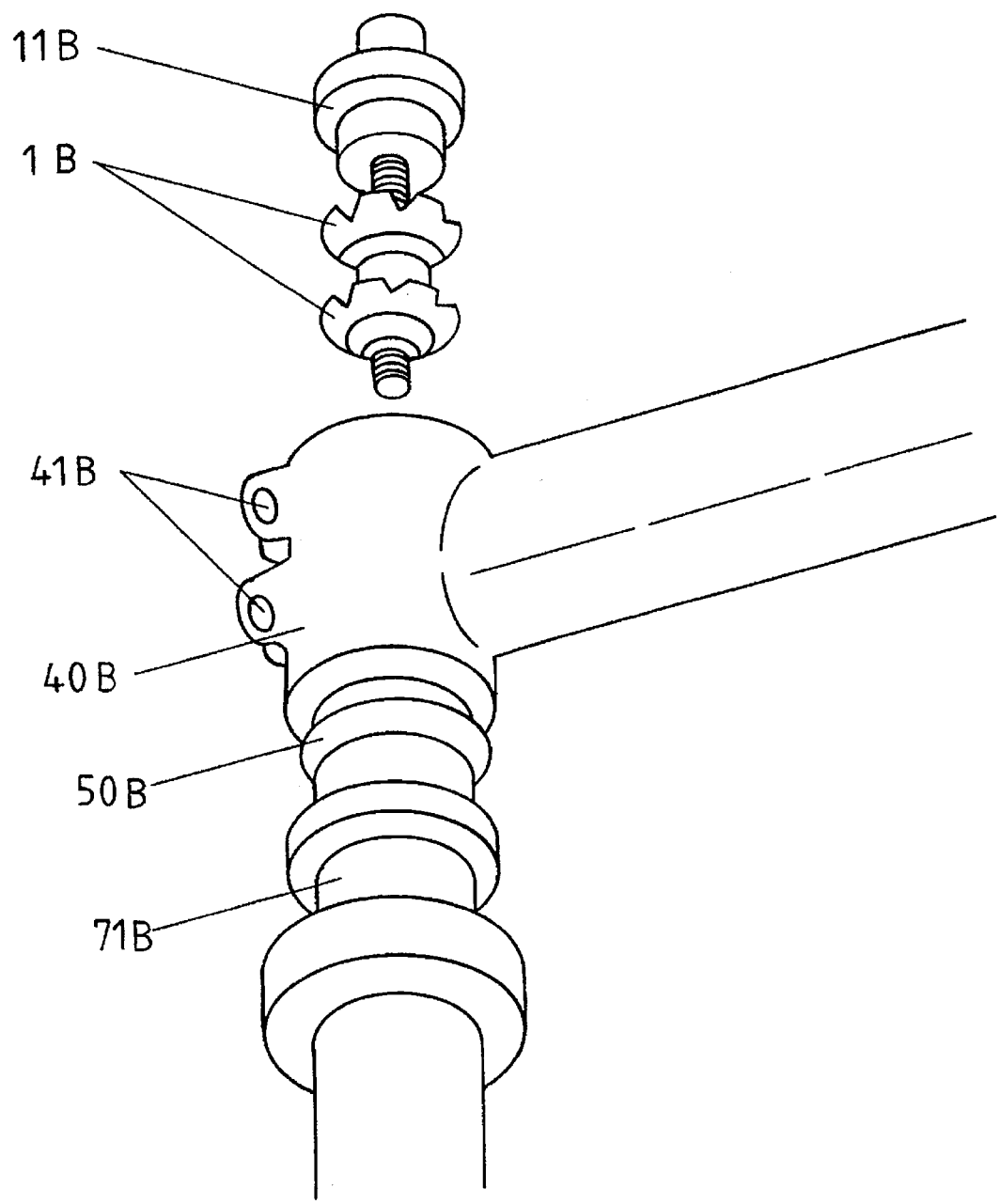
FIG. 2 shows a perspective schematic view of another prior art fastening device.
Figure 3:
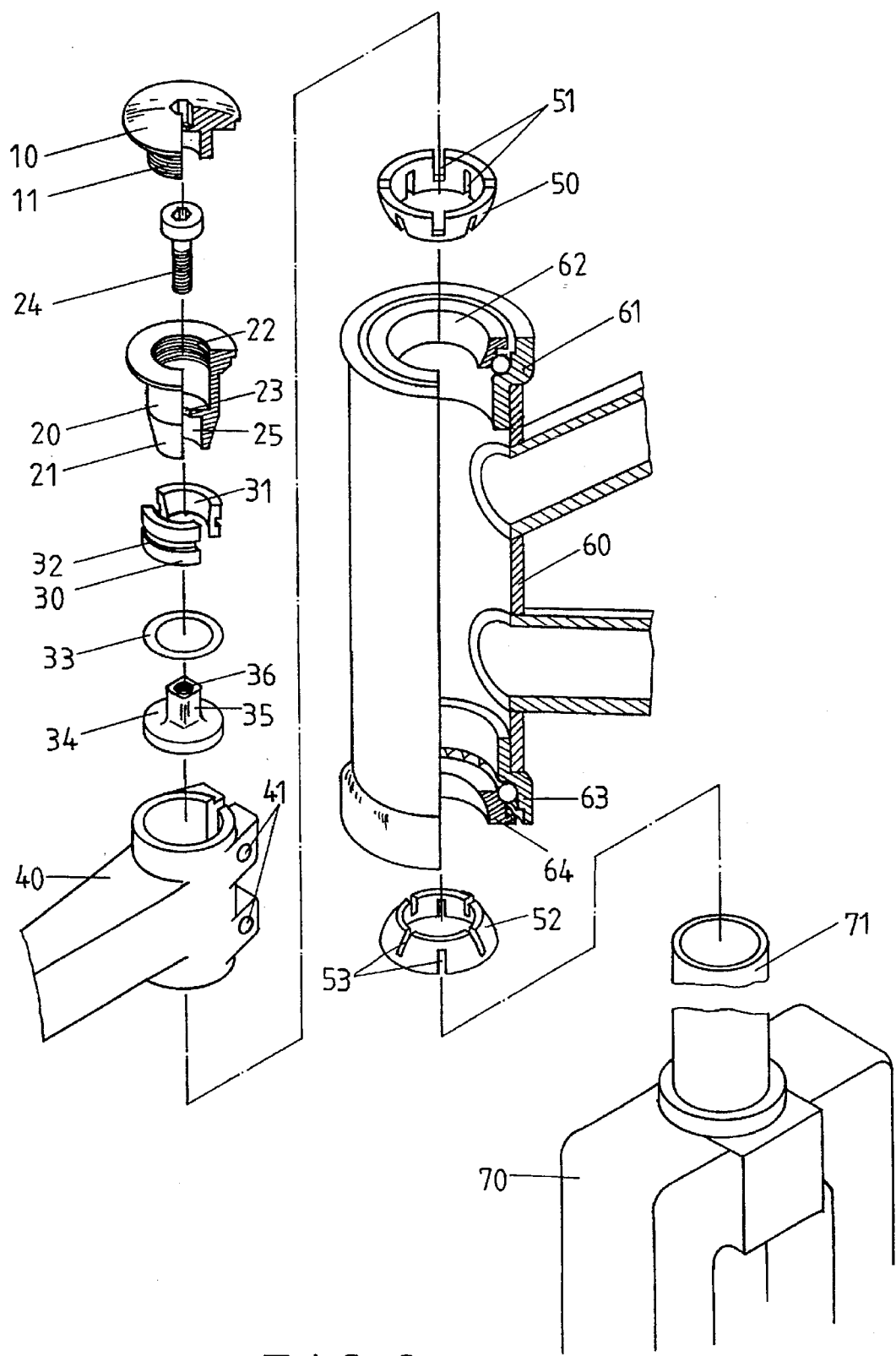
FIG. 3 shows an exploded view of a preferred embodiment of the present invention.

As shown in FIG. 3, an upper cover 10 is provided centrally at the lower end thereof with a bolt 11 and a fastening sleeve 20 of a stepped cylindrical construction. The fastening sleeve 20 has at the front edge thereof an oblique conical portion 21 and further has centrally and axially a threaded hole 22 and a through hole 23, which are engageable with a bolt 24. The fastening sleeve 20 is provided at the lower end thereof with a stopping hole 25 having a square cross section. A cylindrical body is formed by two conical keys 30 which are symmetrical with each other and are held together by a rubber ring 33 retained in the annular grooves 32 of the conical keys 30. Each of the two conical keys 30 is provided on the inner wall thereof with a slant tapered surface 31. Located under the rubber ring 33 is a locking piece 34 which is provided on the upper surface thereof with a stopping column 35 having a square cross section and further having centrally and axially a threaded hole 36 engageable with the bolt 24 for fastening the sleeve 20 and the conical keys 30. Located between a handlebar sleeve 40 and the upper end of a head tube 60 is an arcuate restraining ring 50 which is provided with a plurality of elastic slots 51. The head tube 60 is provided at both ends thereof with bearing sets 61 and 63, which are provided respectively on the inner edge of the top end thereof with arcuate recessed surfaces 62 and 64. Located between the lower end of the head tube 60 and a front fork 70 is another arcuate restraining ring 52 which is also provided with a plurality of elastic slots 53. The front fork 70 is provided at the top end thereof with a front fork steel tube 71.

Figure 4:
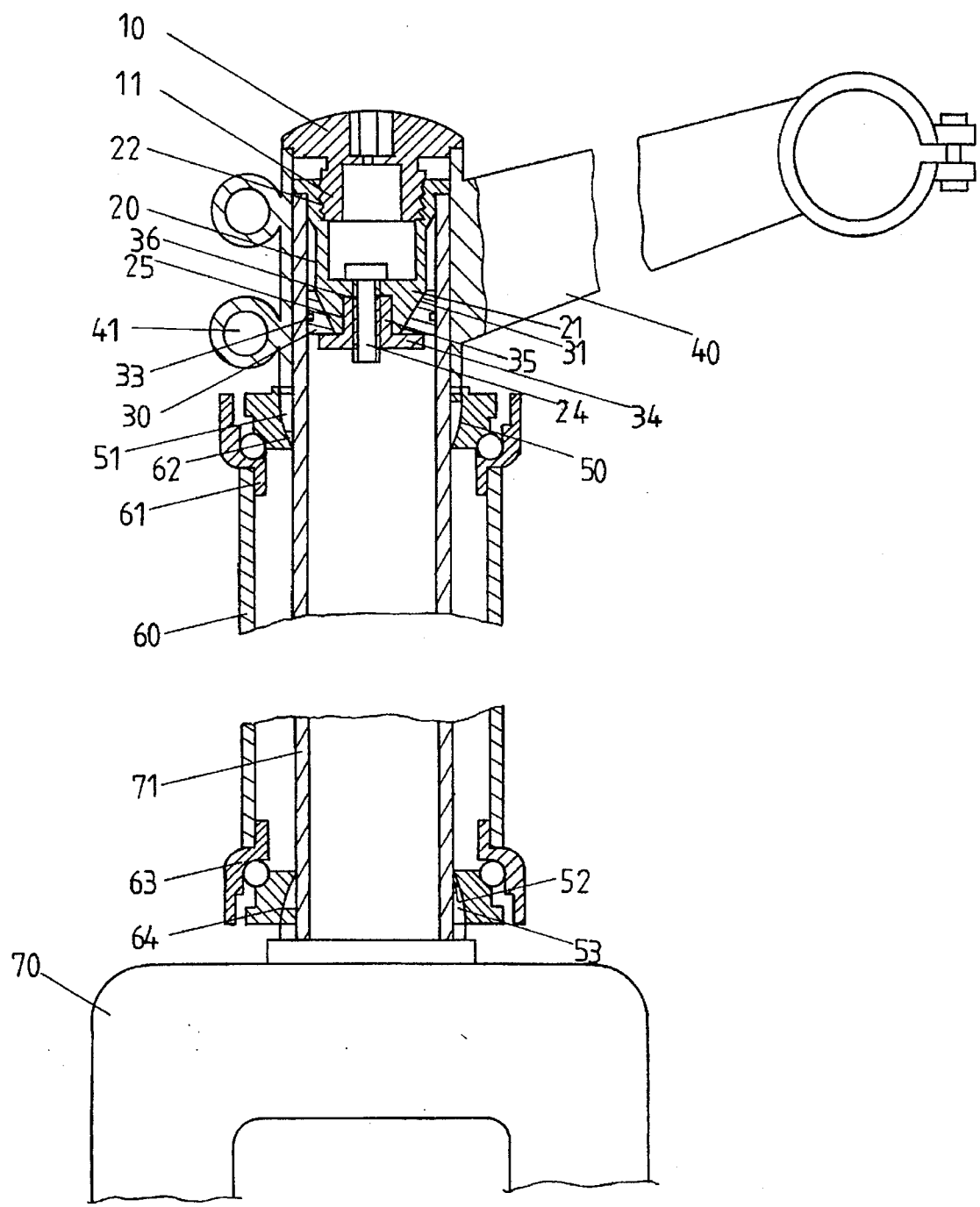
FIG. 4 shows a sectional view of the preferred embodiment in combination according to the present invention.
Figure 5:
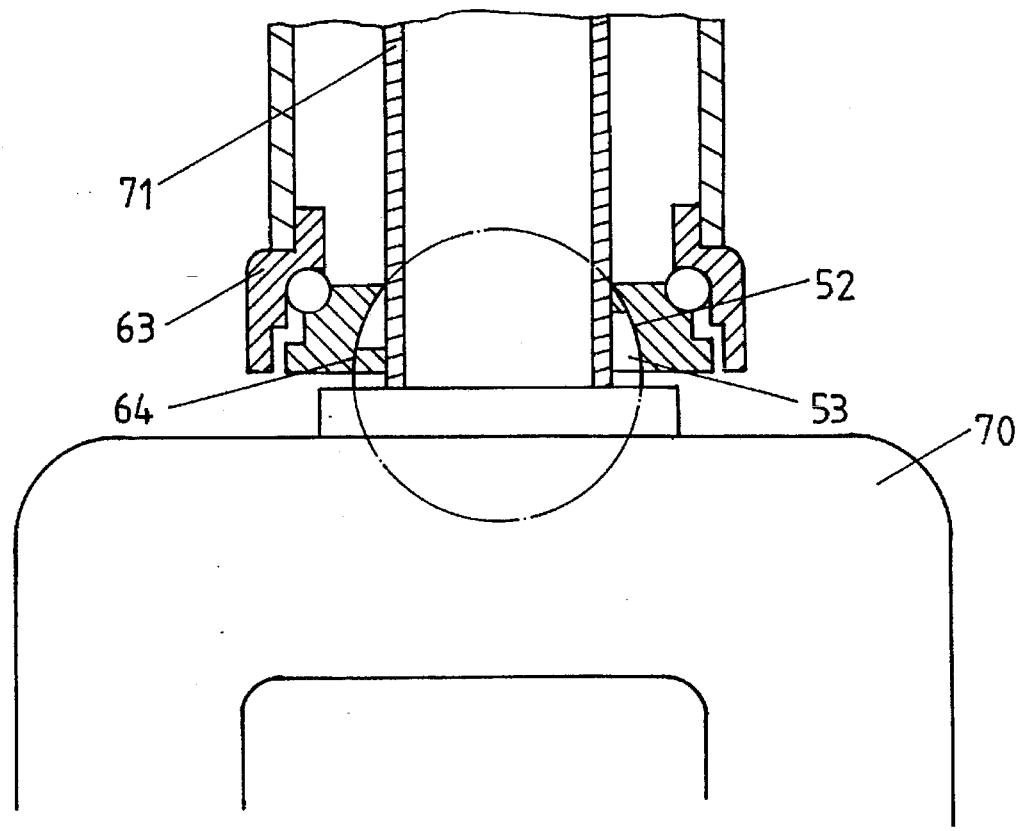
FIG. 5 shows a schematic view of an arcuate restraining ring and a front fork bearing set of the preferred embodiment of the present invention.
Figure 6A:
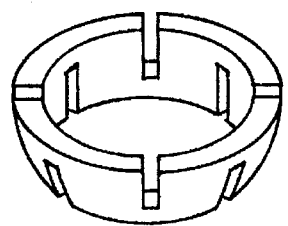
FIGS. 6A–6G show schematic views of the arcuate restraining ring from various directions according to the present invention.
Figure 6B:
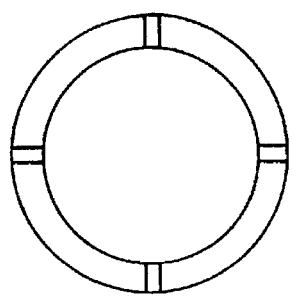
Figure 6F:
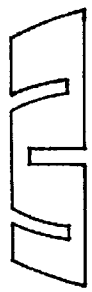
Figure 6C:
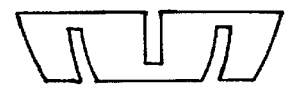
Figure 6G:
Figure 6D:
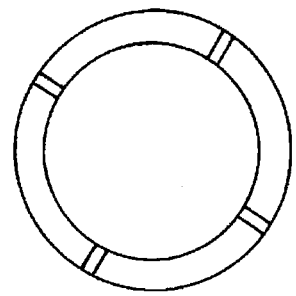
Figure 6E:

As illustrated in FIGS. 4 and 5, two conical keys 30 are held securely together by means of the rubber ring 33. The stopping column 35 of the locking piece 34 is inserted into the stopping hole 25 of the fastening sleeve 20. The locking piece 34 and the bolt 24 are used to fasten the fastening sleeve 20 and the conical keys 30 so as to prevent the locking piece 34 from turning when the bolt 24 is tightened. As they are disposed in the front fork steel tube 71, the bolt 24 is fastened further so as to cause the oblique conical portion 21 of the fastening sleeve 20 to press intensively against the slant tapered surfaces 31 of the conical keys 30, thereby causing the conical keys 30 to expand to give a support to the front fork 70. In addition, the fastening sleeve 20 is fastened securely in the front fork steel tube 71 even if the upper cover 10 is fastened downwards to hold securely the fastening sleeve 20. The front fork steel tube 71 is fitted over in sequence by the arcuate restraining ring 52, the bearing set 63, the head tube 60, the bearing set 61, the arcuate restraining ring 50, and the handlebar sleeve 40. The arcuate restraining rings 50 and 52 are capable of aligning the centers of the horizontal angles of the bearing sets 61 and 63 in view of the fact that the arcuate restraining rings 50 and 52 are provided respectively with elastic slots 51, 53, and that the bearing sets 61 and 63 are provided respectively with the arcuate recessed surfaces 62 and 64, which enable the bearing sets 61 and 63 to turn in all directions. As a result, the centers of all component parts can be aligned automatically. The bearing sets 61 and 63 can be therefore caused to turn smoothly. The bolt 11 of the upper cover 10 is engaged with the threaded hole 22 of the fastening sleeve 20. As the bolt 11 is fastened further, the fastening sleeve 20 and the conical keys 30 are then caused to press intensively the handlebar sleeve 40, the arcuate restraining ring 50, the bearing set 61, the head tube 60, the bearing set 63, the arcuate restraining ring 52, and the front fork steel tube 71. In addition, the elastic slots 51 and 53 of the arcuate restraining rings 50 and 52 are arranged alternately, as shown in FIG. 5, so that the arcuate restraining rings 50 and 52 are waterproof. The head tube 60, the handlebar sleeve 40 and the front fork steel tube 71 can be further fastened securely by tightening up the bolt 41 of the handlebar sleeve 40. As a result, the fastening sleeve 20 is held securely in the front fork steel tube 71 and can not be easily pulled out of the front fork steel tube 71.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A two-step and toothless bicycle head tube bowl set comprising:

an upper cover having a bolt at a lower end thereof;

a fastening sleeve located under said upper cover and having an oblique conical portion at a lower end thereof, said fastening sleeve further including a threaded hole and a through hole along a central axis thereof, said threaded hole and said through hole being engageable with said bolt of said upper cover, said fastening sleeve further including a stopping hole at said lower end, said fastening sleeve having a stepped cylindrical construction;

two symmetrical semi-conical keys;

a rubber ring held in annular grooves of said two symmetrical semi-conical keys;

a locking piece located under said rubber ring and having a stopping column at an upper end thereof, said locking piece further including a threaded hole along a central axis thereof;

a bolt insertable through said through hole of said fastening sleeve and engageable with said threaded hole of said locking piece;

a first arcuate restraining ring located between a handlebar sleeve and an upper end of a head tube of a bicycle and having a plurality of elastic slots having open ends arranged alternatively on top and bottom ends thereof;

two bearing sets located respectively at both ends of said head tube, each having an arcuate recessed surface; and a second arcuate restraining ring disposed between a lower end of said head tube and a front fork and having a plurality of elastic slots having open ends arranged alternately on top and bottom ends thereof.

2. The two-step and toothless bicycle head tube bowl set according to claim 1, wherein said semi-conical keys are expandable to allow said fastening sleeve to be held securely in a front fork steel tube of said bicycle when said upper cover is tightened.

3. The two-step and toothless bicycle head tube bowl set according to claim 1, wherein said first and second arcuate restraining rings automatically align centers of horizontal angles of respective ones of said two bearing sets.

4. The two-step and toothless bicycle head tube bowl set according to claim 1, wherein said second arcuate restraining ring and respective bearing set fit into a front fork steel tube positioned on said front fork without the use of an external mechanical force.

5. The two-step and toothless bicycle head tube bowl set according to claim 1, wherein said stopping column of said locking piece is engageable with said stopping hole of said fastening sleeve for fastening said fastening sleeve and said semi-conical keys securely.

* * * * *